United States Patent [19]
Ilcisin et al.

[11] Patent Number: 5,909,260
[45] Date of Patent: *Jun. 1, 1999

[54] PLASMA ADDRESSED LIQUID CRYSTAL DISPLAY PANEL WITH REDUCED DATA DRIVE ELECTRODE CAPACITANCE

[75] Inventors: Kevin J. Ilcisin; Thomas S. Buzak, both of Beaverton, Oreg.; Paul C. Martin, Vancouver, Wash.

[73] Assignee: Tektronix, Inc., Wilsonville, Oreg.

[21] Appl. No.: 08/857,473

[22] Filed: May 16, 1997

Related U.S. Application Data

[60] Provisional application No. 60/018,229, May 24, 1996.

[51] Int. Cl.$^6$ ................................................. G02F 1/1333
[52] U.S. Cl. .......................... 349/32; 349/122; 349/155
[58] Field of Search ............................. 349/32, 143, 122, 349/139, 155, 156; 345/60; 445/25; 313/582, 584, 585, 586, 587

[56] References Cited

U.S. PATENT DOCUMENTS

| 5,641,974 | 6/1997 | den Boer et al. | 349/138 |
| 5,670,843 | 9/1997 | Matsuura | 445/25 |
| 5,835,167 | 11/1998 | Bongaerts et al. | 349/32 |

OTHER PUBLICATIONS

Perettie et al. "Benzocyclobutene as a Planarization Overcoat for Flat Panel Displays", 1995, no date.
Asia Display—95—pp. 721–724.

*Primary Examiner*—William L. Sikes
*Assistant Examiner*—Tai V. Duong
*Attorney, Agent, or Firm*—John D. Winkelman; John Smith-Hill

[57] ABSTRACT

In a plasma addressed liquid crystal display panel, a separating layer having a lower dielectric constant than the material of the upper substrate is interposed between the data drive electrodes and the upper substrate.

20 Claims, 2 Drawing Sheets

PLASMA ADDRESSED LIQUID CRYSTAL DISPLAY PANEL WITH REDUCED DATA DRIVE ELECTRODE CAPACITANCE

This application claims benefit of provisional application Ser. No. 60/018,229 filed May 24, 1996.

BACKGROUND OF THE INVENTION

This invention relates to a plasma addressed liquid crystal display panel with reduced data drive electrode capacitance.

U.S. Pat. No. 5,077,553 discloses apparatus for addressing data storage elements. A practical implementation of the apparatus shown in U.S. Pat. No. 5,077,553 is illustrated schematically in FIGS. 4–6 of the accompanying drawings.

The display panel shown in FIGS. 4–6 comprises, in sequence from below, a polarizer 2, a channel substrate 4, a cover sheet 6 (commonly known as a microsheet) having a thickness of about 50 $\mu$m, a layer 10 of electro-optic material having a thickness of about 5 $\mu$m, an array of parallel transparent data drive electrodes 12 at uniform width and spacing, an upper substrate 14 carrying the data drive electrodes, and an upper polarizer 16. Depending on the application, the distance across the gap between two adjacent data drive electrodes is typically in the range from 50 $\mu$m to 200 $\mu$m. The channel substrate 2 is typically made of glass and is formed with multiple parallel channels 20 in its upper main face. The channels 20 are filled with an ionizable gas, such as helium. A ground electrode and a strobe electrode (not shown) are provided in each of the channels 20. The channels 20 are orthogonal to the data drive electrodes 12 and the region where a data drive electrode crosses a channel (when viewed perpendicularly to the panel) forms a discrete panel element 22. Each panel element can be considered to include elements of the layer 10 and the upper and lower polarizers 2 and 16. In the case of a color display panel, the panel elements include color filters (not shown) between the layer 10 and the upper substrate 14. Adjacent panel elements 22 are spaced apart along a data drive electrode 12 and/or a channel 20, as shown in FIG. 6. The region of the upper surface of the display panel that bounds the panel element constitutes a single pixel 24 of the display panel.

As explained in U.S. Pat. No. 5,077,553, when a suitable potential difference is established between the strobe and ground electrodes in one of the channels, the gas in that channel forms a plasma that provides a conductive path at the lower surface of the cover sheet 6. If a data drive electrode is at ground potential, there is no significant electric field in the volume element of electro-optic material where the data drive electrode crosses the channel and the pixel is considered to be off, whereas if the data drive electrode is at a substantially different potential from ground, there is a substantial electric field in that volume element of electro-optic material and the pixel is considered to be on. An extended light source (not shown) is provided beneath the panel. In the event that a pixel is off, the upper polarizer passes light received from the volume element of electro-optic material and the pixel is illuminated, whereas if a pixel is on, the upper polarizer blocks light received from the volume element of electro-optic material and the pixel is not illuminated. Black surround material (not shown) is provided between adjacent panel elements in order to absorb stray light.

When a voltage is applied to a data drive electrode in order to change the potential of the electrode, a finite time elapses before the data drive electrode reaches the desired potential. The length of time depends on the resistivity of the data drive electrode and on the capacitance between the data drive electrode and conductive elements that are in the vicinity of the data drive electrode.

In order to avoid objectionable flicker, it is necessary to refresh the image displayed by a plasma addressed liquid crystal display panel at a rate of at least about 60 Hz. The number of lines of data that can be displayed in a field at a refresh rate of 60 Hz depends in part on the time taken to change the potential of a data drive electrode.

It is conventional to assemble a display panel of the kind shown in FIGS. 4–6 by forming a channel substrate assembly, including the channel substrate and the cover sheet, forming an upper substrate assembly, including the upper substrate, the data drive electrodes, and the layer of electro-optic material, and attaching the upper substrate assembly to the channel substrate assembly.

SUMMARY OF THE INVENTION

It has been found that there can be a significant capacitance between adjacent data drive electrodes of a plasma addressed liquid crystal display panel. This capacitance potentially limits the speed at which the potential of a data drive electrode can be changed and accordingly it is desirable that the capacitance between the data drive electrodes be reduced in order that the number of lines of data that can be displayed at a given refresh rate can be increased and the conductivity of the data drive electrodes can be decreased.

It can be shown that the capacitance between two thin, coplanar strip-form conductors that are of uniform width and spacing and are disposed between two dielectric media is proportional to the sum of the dielectric constants of the two dielectric media. Accordingly, the capacitance between two adjacent drive electrodes of a plasma addressed liquid crystal display panel having the configuration shown in FIGS. 4–6 is approximately proportional to the sum of the dielectric constant of the medium above the data drive electrodes, i.e. the glass of the upper substrate, and the dielectric constant of the medium below the data drive electrodes. The dielectric constant of glass that is suitable to form the upper substrate is typically in the range from about 3 to 10.

In accordance with a first aspect of the invention, there is provided a plasma addressed liquid crystal display panel comprising a layer of electro-optic material, an upper substrate having a lower surface that confronts the layer of electro-optic material and also having an upper surface, a separating layer between the lower surface of the upper substrate and the layer of electro-optic material, and an array of data drive electrodes attached to the separating layer and disposed between the separating layer and the layer of electro-optic material, whereby the separating layer is interposed between the data drive electrodes and the upper substrate, and wherein the separating layer is made of a material having a lower dielectric constant than the material of the upper substrate.

In accordance with a second aspect of the invention, there is provided an upper substrate assembly for a plasma addressed liquid crystal display panel, said upper substrate assembly comprising a layer of electro-optic material, an upper substrate having a lower surface that confronts the layer of electro-optic material and also having an upper surface, a separating layer between the lower surface of the upper substrate and the layer of electro-optic material, and an array of data drive electrodes attached to the separating layer and disposed between the separating layer and the layer of electro-optic material, whereby the separating layer is interposed between the data drive electrodes and the upper substrate, and wherein the separating layer is made of a material having a lower dielectric constant than the material of the upper substrate.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numeral designate corresponding components.

In the following description, words of orientation and position, such as upper and lower, are used to establish orientation relative to the drawings and are not intended to be limiting in an absolute sense. Thus, a surface that is described as upper in the specification may correspond, in a practical implementation of the invention, to a lower surface or a vertical surface, which is neither upper nor lower.

DETAILED DESCRIPTION

As noted previously, the capacitance between two adjacent coplanar strip-form conductors of uniform width and spacing depends on the sum of the dielectric constants of the two media at opposite respective sides of the plane of the conductors. In the event that the dielectric constant of one of the two media varies as a function of distance from the plane of the conductors, the capacitance between the conductors depends more strongly on the dielectric constant of that medium at a distance from the plane of the conductors that is less than the distance across the gap between the conductors than on the dielectric constant of the medium at a distance from the plane of the conductors that is substantially greater than the distance across the gap.

Figure 1:
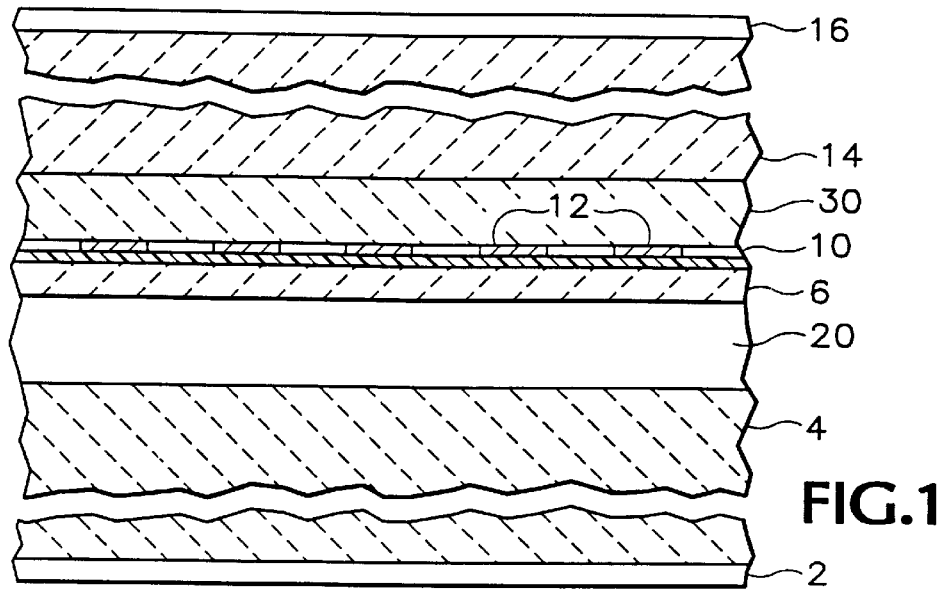
FIG. 1 is a sectional view of a first plasma addressed liquid crystal display panel embodying the present invention.
Figure 4:
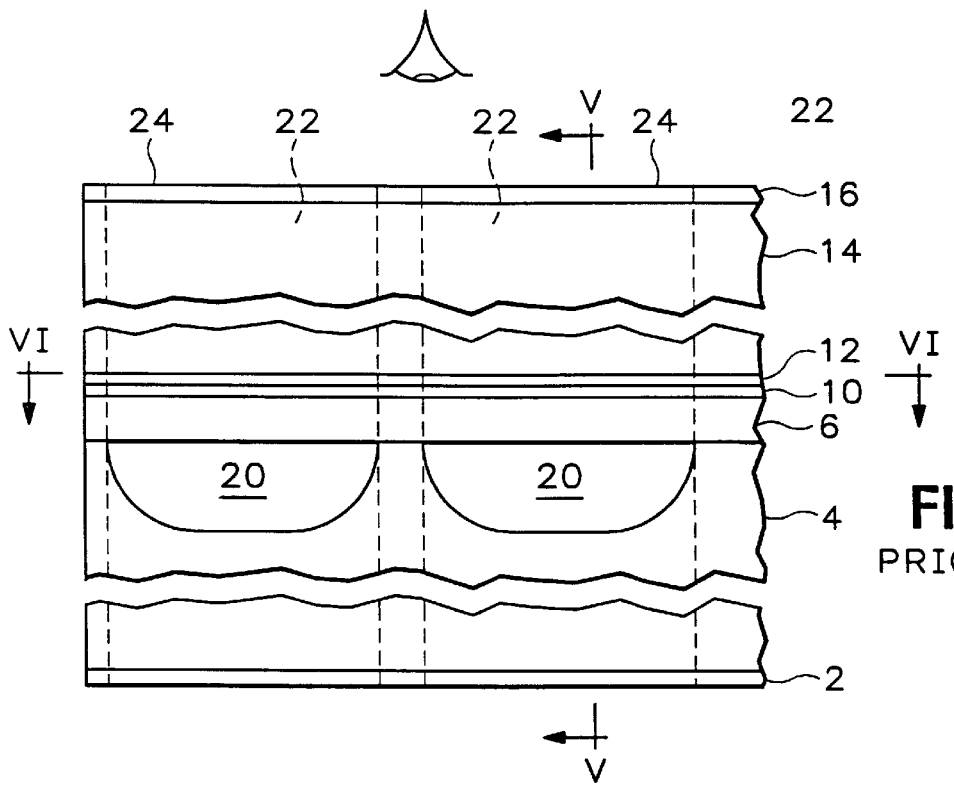
FIG. 4 is a schematic sectional view of a plasma addressed liquid crystal display panel in accordance with the prior art.
Figure 5:
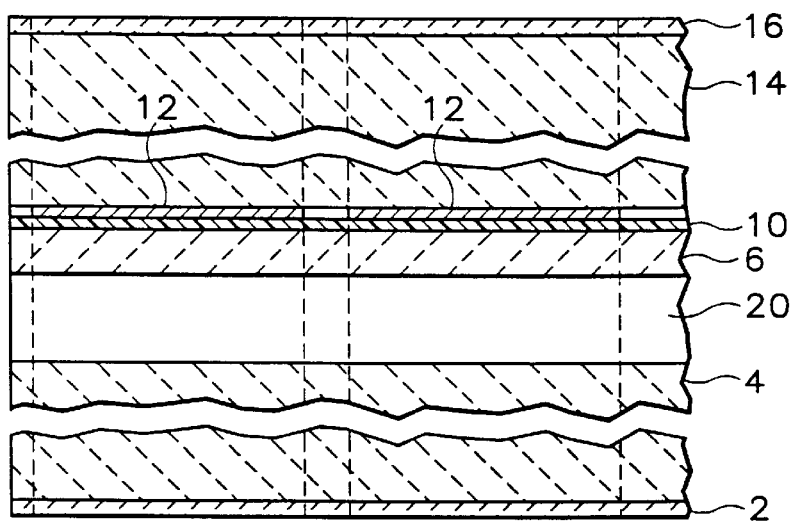
FIG. 5 is a sectional view of the display panel shown in FIG. 4 taken on the line V—V in FIG. 4.
Figure 6:
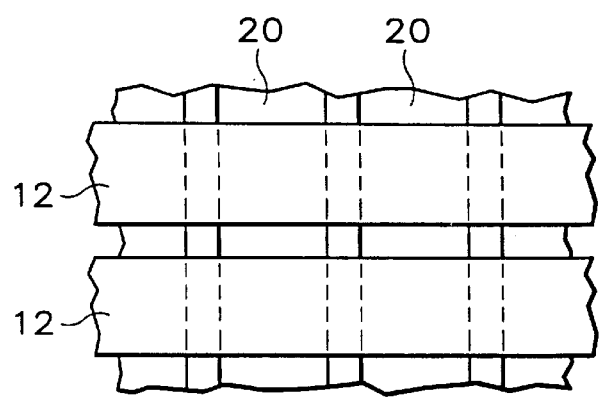
FIG. 6 is a sectional view of the display panel shown in FIGS. 4 and 5, illustrated on a reduced scale and taken on the line VI–VI in FIG. 5.

The plasma display panel shown in FIG. 1 differs from that described with reference to FIGS. 4–6 by virtue of there being a separating layer 30 between the upper substrate 14 and the data drive electrodes 12. The thickness of the separating layer 30 is approximately equal to the distance g across the gap between the data drive electrodes. Accordingly, the capacitance between the data drive electrodes is substantially independent of the dielectric constant of the glass of the upper substrate 14 and is substantially proportional to the sum of the dielectric constant of the material of the separating layer and the dielectric constant of the medium beneath the data drive electrodes.

The separating layer 30 is made of a material having a lower dielectric constant than the glass of the upper substrate. Therefore, the capacitance between the data drive electrodes of the panel shown in FIG. 1 is less than that for a plasma display panel that is of the same construction except that it does not include the separating layer 30. Because of the reduction in capacitance, the power required to drive the display panel shown in FIG. 1 is less than that required to drive a display panel of the same construction except for the separating layer.

A suitable material for the separating layer 30 is the thermosetting resin known as benzocyclobutene, which has a dielectric constant of about 2.7 at 10 kHz and is commercially available from Dow Chemical Company. Benzocyclobutene is applied to the upper substrate by spinning it on to the lower surface of the upper substrate and heating it so that it polymerizes. The data drive electrodes are formed on the lower surface of the separating layer, and color filters and black surround material are deposited partially on the data drive electrodes and partially on the separating layer.

Figure 2:
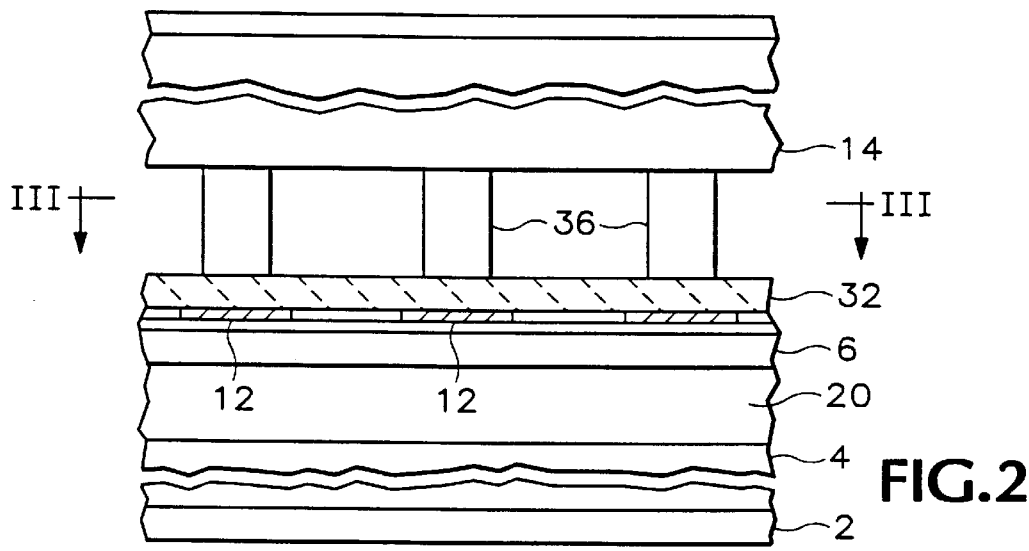
FIG. 2 is a sectional view of a second plasma addressed liquid crystal display panel embodying the present invention.
Figure 3:
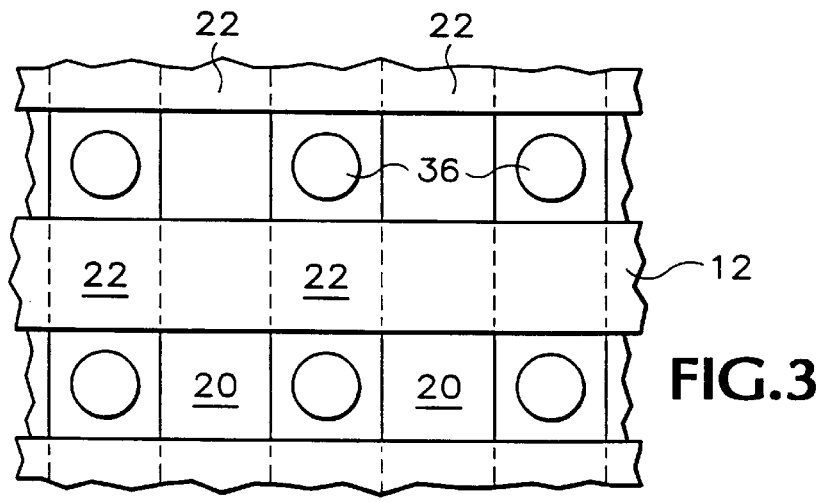
FIG. 3 is a sectional view taken on the line III—III of FIG. 2.

In the display panel shown in FIGS. 2 and 3, the data drive electrodes 12 are not deposited on the upper substrate 14 but are deposited on a thin sheet 32 of a transparent material and the sheet 32 is held in parallel spaced relationship with respect to the lower surface of the upper substrate by spacers 36.

The spacers 36, which are illustrated in FIGS. 2 and 3 as being cylindrical in configuration, are located outside the panel elements 22 so that they do not occlude the panel elements. The spacers may be made of benzocyclobutene and may be formed by spinning benzocyclobutene on to the lower surface of the upper substrate 14 to form a layer of uniform thickness, heating the layer of benzocyclobutene in order to polymerize it, and selectively removing the layer using conventional photolithographic processes.

The assembly of the sheet 32 and the data drive electrodes 12 attached thereto is attached to the spacers 36 projecting from the lower surface of the upper substrate using a suitable adhesive, such as an epoxy adhesive. It may be desired to seal the space between the sheet 32 and the upper substrate around the periphery of the upper substrate in order to allow partial evacuation of this space.

The distance between the data drive electrodes and the lower surface of the upper substrate is greater than the distance across the gap between the data drive electrodes and so the capacitance between two adjacent data drive electrodes is substantially independent of the dielectric constant of the glass of the upper substrate.

In the event that the thickness of the sheet 32 is substantially less than the distance across the gap between the data drive electrodes, the dielectric constant of the material of the sheet 32 makes only a small contribution to the capacitance between two adjacent data drive electrodes. Nevertheless, because the electric field between the data drive electrodes is larger in the sheet 32 than in the space between the sheet 32 and the upper substrate, it is desirable that the sheet 32 be made of low dielectric constant material, such as a synthetic polymer material.

The dielectric constant of the medium between the sheet 32 and the upper substrate 14 is not uniform, because of the presence of the spacers 36, but it is in any event substantially less than that of glass. The combined effect of the sheet 32 and the dielectric medium between the sheet 32 and the upper substrate is to reduce the effective dielectric constant of the medium above the data drive electrodes so that it is substantially lower than that of the glass of the upper substrate. In this manner, the capacitance between the data drive electrodes is substantially reduced relative to the conventional display panel shown in FIGS. 4–6.

It will be appreciated that the invention is not restricted to the particular embodiment that has been described, and that variations may be made therein without departing from the scope of the invention as defined in the appended claims and equivalents thereof.

What is claimed is:

1. A plasma addressed liquid crystal display panel comprising:

a layer of electro-optic material, an upper substrate having a lower surface that confronts the layer of electro-optic material and also having an upper surface, a separating layer between the lower surface of the upper substrate and the layer of electro-optic material, and an array of data drive electrodes attached to the separating layer and disposed between the separating layer and the layer of electro-optic material, whereby the separating layer is interposed between the data drive electrodes and the upper substrate, and wherein the separating layer is made of a material having a lower dielectric constant than the material of the upper substrate.

2. A display panel according to claim 1, wherein the upper substrate is made of glass and the separating layer is made of a synthetic polymer material.

3. A display panel according to claim 2, wherein the separating layer is made of benzocyclobutene.

4. A display panel according to claim 1, wherein the data drive electrodes are of uniform width and spacing and the separating layer is of thickness at least as great as the spacing between two adjacent data drive electrodes.

5. A plasma addressed liquid crystal display panel comprising:

a layer of electro-optic material, an upper substrate having a lower surface that confronts the layer of electro-optic material and also having an upper surface, a separating layer between the lower surface of the upper substrate and the layer of electro-optic material, and an array of data drive electrodes attached to the separating layer and disposed between the separating layer and the layer of electro-optic material, whereby the separating layer is interposed between the data drive electrodes and the upper substrate, and wherein the separating layer is composed of a sheet of dielectric material, a spacer structure holding the sheet of dielectric material in spaced parallel relationship with respect to the lower surface of the upper substrate, and a gaseous medium between the sheet of dielectric material and the upper substrate.

6. A display panel according to claim 5, wherein the spacer structure comprises an array of discrete spacer elements.

7. A display panel according to claim 5, wherein the spacer structure is made of a synthetic polymer material.

8. A display panel according to claim 7, wherein the spacer structure is made of benzocyclobutene.

9. A display panel according to claim 5, wherein the sheet of dielectric material is sealed to the upper substrate around periphery thereof.

10. A display panel according to claim 5, wherein the sheet of dielectric material is made of a synthetic polymer material.

11. An upper substrate assembly for a plasma addressed liquid crystal display panel, said upper substrate assembly comprising:

a layer of electro-optic material, an upper substrate having a lower surface that confronts the layer of electro-optic material and also having an upper surface, a separating layer between the lower surface of the upper substrate and the layer of electro-optic material, and an array of data drive electrodes attached to the separating layer and disposed between the separating layer and the layer of electro-optic material, whereby the separating layer is interposed between the data drive electrodes and the upper substrate, and wherein the separating layer is made of a material having a lower dielectric constant than the material of the upper substrate.

12. An upper substrate assembly according to claim 11, wherein the upper substrate is made of glass and the separating layer is made of a synthetic polymer material.

13. An upper substrate assembly according to claim 12, wherein the separating layer is made of benzocyclobutene.

14. An upper substrate assembly according to claim 11, wherein the data drive electrodes are of uniform width and spacing and the separating layer is of thickness at least as great as the spacing between two adjacent data drive electrodes.

15. An upper substrate assembly for a plasma addressed liquid crystal display panel, said upper substrate assembly comprising:

a layer of electro-optic material, an upper substrate having a lower surface that confronts the layer of electro-optic material and also having an upper surface, a separating layer between the lower surface of the upper substrate and the layer of electro-optic material, and an array of data drive electrodes attached to the separating layer and disposed between the separating layer and the layer of electro-optic material, whereby the separating layer is interposed between the data drive electrodes and the under substrate, wherein the separating layer is composed of a sheet of dielectric material, a spacer structure holding the sheet of dielectric material in spaced parallel relationship with respect to the lower surface of the upper substrate, and a gaseous medium between the sheet of dielectric material and the upper substrate.

16. An upper substrate assembly according to claim 15, wherein the spacer structure comprises an array of discrete spacer elements.

17. An upper substrate assembly according to claim 15, wherein the spacer structure is made of a synthetic polymer material.

18. An upper substrate assembly according to claim 17, wherein the spacer structure is made of benzocyclobutene.

19. An upper substrate assembly according to claim 15, wherein the sheet of dielectric material is sealed to the upper substrate around periphery thereof.

20. An upper substrate assembly according to claim 15, wherein the sheet of dielectric material is made of a synthetic polymer material.

* * * * *